Figure 1:
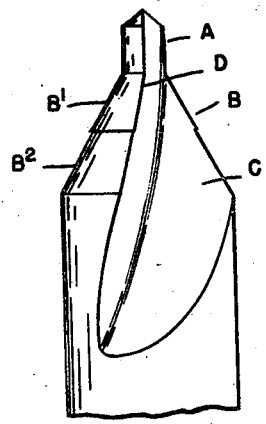

Feb. 4, 1947.  O. ARNDT  2,415,329
CENTER DRILL
Filed Nov. 6, 1944

INVENTOR.
OSCAR ARNDT
BY
*Whittemore Hulbert & Belknap*
ATTORNEYS

Patented Feb. 4, 1947

2,415,329

UNITED STATES PATENT OFFICE 2,415,329

CENTER DRILL

Oscar Arndt, Detroit, Mich.

Application November 6, 1944, Serial No. 562,133

3 Claims. (Cl. 77—66)

The invention relates to tools for forming recess centers in work to provide bearings thereon for engagement with the supporting centers of a lathe or other machine tool. Such tools are usually formed with a small diameter drill portion and an adjacent conical reamer portion. The drill forms a clearance in the work for the portion of the supporting center adjacent its apex, while the conical reamer portion forms the bearing for engaging said supporting center. The purpose of this clearance is to form in the work a more accurate conical bearing but in actual practice it does not always accomplish this result. This is for the reason that there are always minute inaccuracies in the cutting of the bearing which initially throw the work into slightly eccentric position. Also, the rotation of the bearing about the non-rotating supporting center will cause wear which slightly shifts the axis of rotation. The portion of the conical bearing nearest the axis is subjected to the greatest wear and, therefore, any initial inaccuracy in this portion will have the greatest effect in the subsequent shifting of the axis.

It is the object of the invention to avoid the defects in centering tools as heretofore constructed and to this end the invention consists in the construction as hereinafter set forth.

Figure 2:
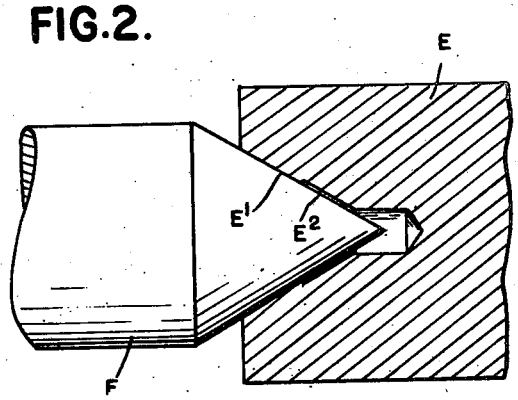

In the drawing:

Fig. 1 is an elevation of my improved center drilling tool drawn to an enlarged scale; and Fig. 2 is a longitudinal section through a portion of a work member in which a recess center bearing is formed and showing the same in engagement with a supporting center.

In general construction my improved tool is similar to tools heretofore made in having a drill portion A, an adjacent conical reamer portion B and a recess C extending longitudinally of both portions to form a cutting edge D. However, instead of forming the reamer portion with its entire surface in a cone having a single apex, my improved reamer has two conical portions with different apexes. Thus, the portion B' which is nearest the axis has its apex slightly in advance of the portion B² which is farther from the axis.

In other words, the portion B² may be regarded as a clearance, ground in the portion B'. The depth of the clearance (which is exaggerated in the drawing) is very slight as, for instance, .0015 of an inch.

In the operation of forming a recess center in a work piece, such as E, the portion B² of the tool will fashion the bearing portion E', while the portion B' will cut a clearance E². Consequently, when a supporting center F is engaged with the recess, it will first bear against the conical portion E' thereof. As this portion is farthest from the axis and of greatest area, inaccuracies therein will be minimized and, when the work is rotated upon the center F, any inaccuracy therein will be quickly eliminated. Furthermore, as the rotation continues and slight wear occurs, the bearing will be extended to include the area of the portion E². Thus, a true bearing will be formed which will always hold the work concentric with the same axis.

What I claim as my invention is:

1. A center forming tool comprising a drill and a conical reamer, the latter having a portion adjacent the drill, the apex of which is slightly in advance of the apex of the remaining portion both portions being at the same angle to the axis.

2. A center forming tool comprising an integral drill and conical reamer, the latter having a portion of its area farthest from the apex slightly relieved to form a parallel cone.

3. A center forming tool comprising an integral drill and conical reamer, the latter having a portion of its area farthest from the apex relieved to a depth of not more than .002 of an inch to form a parallel cone.

OSCAR ARNDT.

REFERENCES CITED

The following references are of record in the file of this patent:

UNITED STATES PATENTS

| Number | Name | Date |
|---|---|---|
| 1,017,352 | Wagner | Feb. 13, 1912 |
| 2,334,845 | Schwartz | Nov. 23, 1943 |